United States Patent
Christenson et al.

(10) Patent No.: US 9,045,216 B2
(45) Date of Patent: Jun. 2, 2015

(54) FLIGHT VEHICLE FAIRING HAVING VIBRATION-DAMPING BLANKETS

(75) Inventors: Justin Christenson, Mountlake Terrace, WA (US); Herbert L. Hoffman, Seattle, WA (US); Juhn-Shyue Lin, Renton, WA (US); Gary R. Chewning, Woodinville, WA (US); Alan Edgar Landmann, Woodinville, WA (US); Adrian Viisoreanu, Kent, WA (US); Hugh Poling, Seattle, WA (US); Balamurugan R. Annamalai, Snohomish, WA (US); Justin D. Kearns, Seattle, WA (US); Jason Alexander Gordon, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 13/169,295

(22) Filed: Jun. 27, 2011

(65) Prior Publication Data

US 2012/0325966 A1 Dec. 27, 2012
US 2014/0361120 A9 Dec. 11, 2014

Related U.S. Application Data

(63) Continuation-in-part of application No. 12/016,741, filed on Jan. 18, 2008, now Pat. No. 8,056,850.

(51) Int. Cl.
*B64C 1/40* (2006.01)
*B64C 1/26* (2006.01)

(52) U.S. Cl.
CPC .............. *B64C 1/26* (2013.01); *Y10T 29/49826* (2015.01); *Y10T 29/49723* (2015.01); *B64C 1/40* (2013.01); *Y02T 50/46* (2013.01)

(58) Field of Classification Search
USPC .............. 244/119, 121, 129.2, 1 N; 52/746.1, 52/406.2, 407.1, 407.3
See application file for complete search history.

(56) References Cited

U.S. PATENT DOCUMENTS 3,160,549 A * 12/1964 Caldwell et al. .............. 244/119
4,124,732 A * 11/1978 Leger ............................ 244/121
(Continued)

FOREIGN PATENT DOCUMENTS

| DE | 102009015590 A1 | 10/2010 |
| EP | 2415664 A2 | 2/2012 |
| FR | 1312201 A | 12/1962 |

OTHER PUBLICATIONS

International Search Report and Written Opinion, Nov. 12, 2012, International Application No. PCT/US2012/042996.

*Primary Examiner* — Joseph W Sanderson
*Assistant Examiner* — Marc Burgess
(74) *Attorney, Agent, or Firm* — Ostrager Chong Flaherty & Broitman P.C.

(57) ABSTRACT

Vibration-damping blankets are attached to the back surfaces of fairing panels of a flight vehicle (e.g., an aircraft or spacecraft) to reduce vibration, fatigue, structure and airborne transmitted energy, and cabin noise. In one case, the flight vehicle fairing has an exterior comprising exterior surfaces of a multiplicity of removable panels. A method of retrofitting the flight vehicle with vibration-damping blankets comprises: removing a panel from the flight vehicle exterior; attaching a vibration-damping blanket to a back surface of the removed panel; and installing the panel with attached vibration-damping blanket on the flight vehicle with the exterior surface of the panel forming part of the flight vehicle exterior. In one embodiment, the vibration-damping blanket comprises polymeric (e.g., aromatic polyamide) fibers in a nonwoven structure.

18 Claims, 3 Drawing Sheets

(56) References Cited

U.S. PATENT DOCUMENTS

| | | | |
|---|---|---|---|
| 4,151,800 A * | 5/1979 | Dotts et al. | 244/159.1 |
| 5,169,700 A * | 12/1992 | Meier et al. | 244/121 |
| 5,759,659 A * | 6/1998 | Sanocki et al. | 244/119 |
| 5,851,626 A * | 12/1998 | McCorry et al. | 181/288 |
| 6,358,591 B1 * | 3/2002 | Smith | 428/74 |
| 6,851,515 B2 * | 2/2005 | Dussac et al. | 181/284 |
| 7,083,147 B2 * | 8/2006 | Movsesian et al. | 244/121 |
| 7,216,922 B2 | 5/2007 | Tuohimaa et al. | |
| 7,798,287 B1 * | 9/2010 | Surace et al. | 181/290 |
| 8,479,880 B2 * | 7/2013 | Mathur | 244/119 |
| 2002/0170235 A1 * | 11/2002 | Petroski et al. | 49/502 |
| 2003/0066933 A1 | 4/2003 | Maury et al. | |
| 2005/0194210 A1 * | 9/2005 | Panossian | 181/293 |
| 2007/0155265 A1 | 7/2007 | Anderson | |
| 2008/0003907 A1 * | 1/2008 | Black et al. | 442/327 |
| 2009/0078820 A1 | 3/2009 | Lin et al. | |
| 2009/0184200 A1 | 7/2009 | Lin et al. | |
| 2009/0184206 A1 * | 7/2009 | Lin et al. | 244/158.1 |
| 2010/0032234 A1 * | 2/2010 | Niwa et al. | 181/290 |
| 2012/0012698 A1 * | 1/2012 | Goehlich et al. | 244/1 N |

* cited by examiner

FLIGHT VEHICLE FAIRING HAVING VIBRATION-DAMPING BLANKETS

RELATED PATENT APPLICATION

This application is a continuation-in-part of and claims the benefit of and priority from U.S. patent application Ser. No. 12/016,741 filed on Jul. 23, 2009, which issued as U.S. Pat. No. 8,056,850 on Nov. 15, 2011.

BACKGROUND

This disclosure generally relates to systems and methods for reducing or minimizing vibrations in the fairing of a flight vehicle, such as an aircraft or spacecraft, thereby also reducing noise and fatigue caused by such vibrations.

Aircraft, spacecraft and other flight vehicles often experience substantial vibrations, noise and fatigue in fairings and, in particular, in wing-to-body fairings which are attached between the wings and body of the aircraft, spacecraft or other flight vehicle. Some prior art devices may have involved heavy, complex, excessive parts and/or expensive noise- and vibration-damping devices in an effort to reduce vibrations, noise and fatigue. However, many of these prior art devices do not sufficiently reduce noise, vibration and/or fatigue, and/or may lead to increased weight, increased complexity, an increased number of parts, an increased cost, and/or other issues. For example, in the past insulation blankets have been added to aircraft cabins in order to reduce the cabin noise to acceptable levels. These blankets added weight to the aircraft.

In the case of fairings comprising a multiplicity of panels fastened to a support structure that is part of the flight vehicle, fairing panel vibration may additionally cause panels to loosen.

There is a need for a method of constructing fairings that reduces vibration, fatigue and resultant cabin noise by dissipational damping of vibrational energy and its conversion to heat energy. There is also a need to solve the problem of fairing panels vibrating and loosening.

SUMMARY

In accordance with the embodiments disclosed hereinafter, vibration-damping blankets are sufficiently attached to the back surfaces of fairing panels of a flight vehicle to reduce vibration, fatigue, structure and airborne transmitted energy, and cabin noise. This can be done during assembly of the flight vehicle or during retrofitting of existing flight vehicles. In the disclosed embodiments, the blankets comprise polymeric (e.g., aromatic polyamide) fibers in a nonwoven structure onto which an adhesive backing is applied for easy installation. However, the blankets may be constructed in other ways and with other materials such that a similar vibration-damping effect can be achieved.

One aspect of the invention is a method for retrofitting a flight vehicle fairing comprising an assembly of any number of removable panels by adhering vibration-damping blankets to the back surfaces of all or one or more selected panels. The method comprises removing a panel from the fairing exterior; attaching a vibration-damping blanket to a back surface of the removed panel; and installing the panel with attached vibration-damping blanket on the fairing with the exterior surface of the panel forming part of the fairing exterior.

Another aspect of the invention is a method for assembling a fairing of a flight vehicle. The method comprises attaching a vibration-damping blanket to a back surface of a panel; and fastening the panel with attached vibration-damping blanket to the fairing with the exterior surface of the panel forming part of the fairing exterior.

A further aspect of the invention is a fairing for a flight vehicle comprising a multiplicity of panels, each panel having an exterior surface that forms a part of an exterior of the fairing, wherein at least one of the panels has a vibration-damping blanket attached to a back surface thereof.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
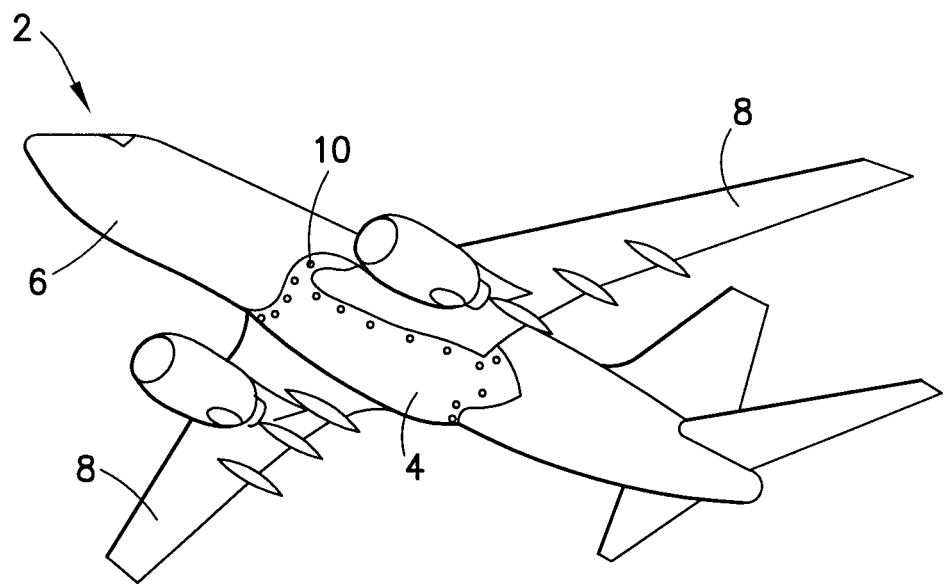
FIG. 1 is a diagram showing a bottom isometric view of one embodiment of a wing-to-body fairing attached between a body and wing of an aircraft.

FIG. 1 shows one embodiment of a wing-to-body fairing 4 attached between a body 6 and wings 8 of an aircraft 2. The wing-to-body fairing 4 may be attached to body 6 utilizing fasteners 10 and/or other attachment mechanisms.

Figure 2:
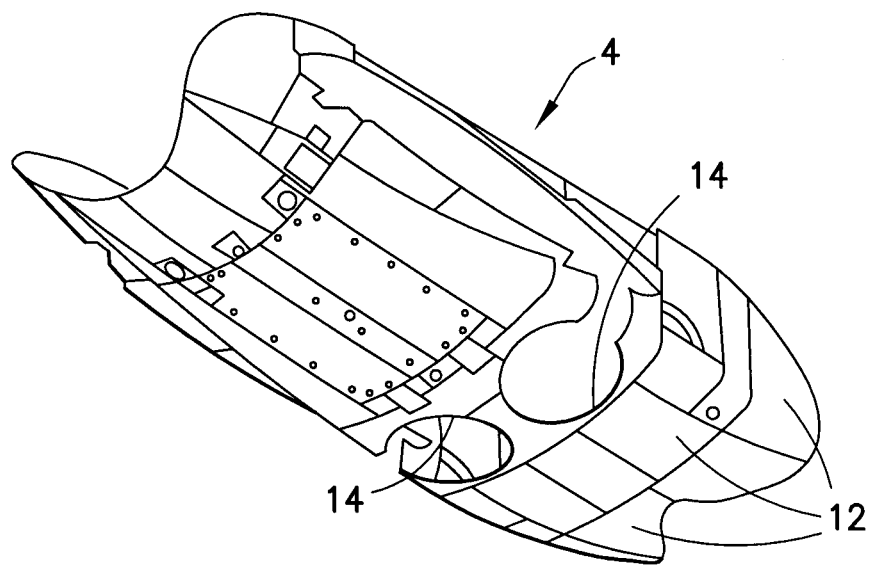
FIG. 2 is a diagram showing a bottom isometric view of the wing-to-body fairing of FIG. 1 separated from the aircraft.

FIG. 2 shows the wing-to-body fairing 4 of FIG. 1 separated from the aircraft 2. The fairing 4 comprises a multiplicity of panels 12 attached to a support structure, which support structure in turn is a lattice attached to the body of the flight vehicle. The support structure is not depicted in FIG. 2. However, the use and construction of such a support structure is well known. For example, the panel support structure may be made of aluminum. The fairing 4 has openings for the wings and also has wheel wells 14 which receive the landing wheels when the landing gear is not deployed during flight.

Figure 3:
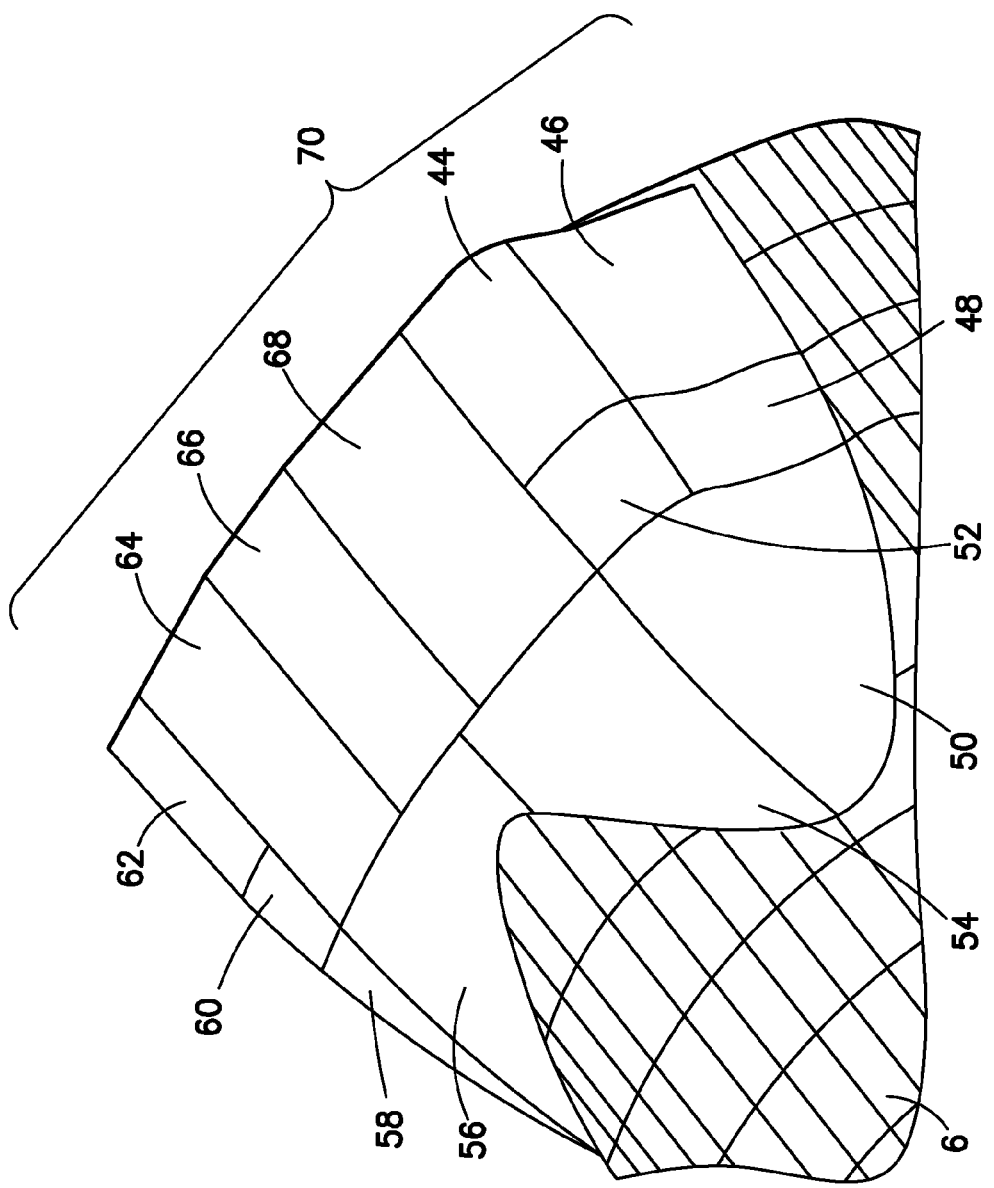
FIG. 3 is a diagram showing fairing panels located aft of the wheel wells of the wing-to-body fairing of FIG. 2.

FIG. 3 shows the aft portion 70 of a typical wing-to-body fairing (WTBF) assembly comprising a multiplicity of removable panels fastened to a lattice or similar support structure. More specifically, the aft portion 70 comprises a multiplicity of panels located aft of the wheel wells (see items 14 in FIG. 2) of the fairing. The panels of the aft portion 70 of the fairing depicted in FIG. 3 are respectively numbered 44, 46, 48, 50, 52, 54, 56, 58 60, 62, 64, 66 and 68. Although vibration-damping blankets can be attached to the back surfaces of all of these panels, in accordance with one embodiment, such blankets are attached to the back surfaces of at least panels 50, 54, 56, 58, 66 and 68.

Figure 4:
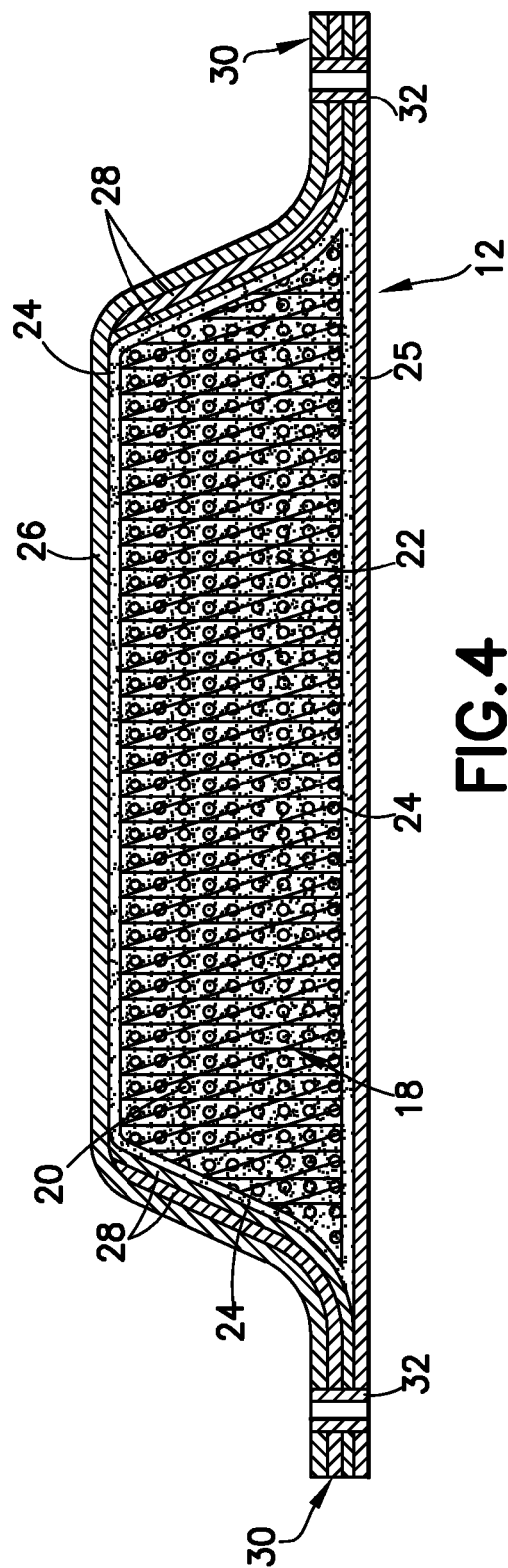
FIG. 4 is a diagram showing a cross-sectional view of a known wing-to-body fairing panel disclosed in U.S. Patent Application Pub. No. 2009/0184206.
Figure 5:
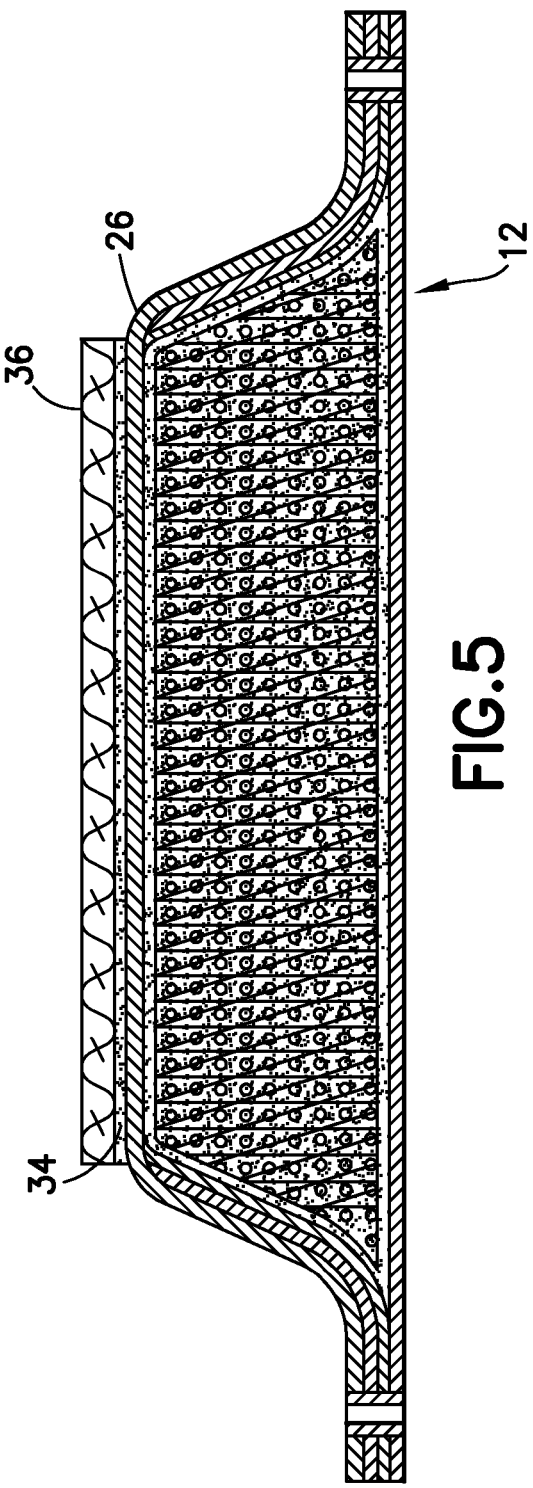
FIG. 5 is a diagram showing a cross-sectional view of a wing-to-body fairing panel equipped with a vibration-damping blanket in accordance with one embodiment of the invention.

FIG. 4 shows a cross-sectional view of a prior art WTBF panel 12 which has not been retrofitted in accordance with the teaching herein, whereas FIG. 5 shows the same view, except with a vibration-damping blanket 36 attached, e.g., by a layer of adhesive 34, to the back surface of the prior art panel 12. In accordance with the present teaching, vibration-damping blankets can be attached to selected or all fairing panels, either during original production of the flight vehicle or during retrofitting of an existing flight vehicle.

As shown in FIG. 4, prior art WTBF panel 12 comprises a honeycomb center 18 sandwiched between front and rear panel walls 25 and 26, respectively. The front panel wall 25 is planar, while the rear panel wall 26 is not planar. A central portion of rear panel wall 26 forms a plateau with a generally flat surface on the back surface of the panel. In cooperation, panel walls 25 and 26 form a cavity for receiving the honeycomb center 18. Two adjacent layers 28 are laminated to each other and disposed along the perimeter of the panel 12. Portions of layers 28 are sandwiched between and laminated to respective portions of panel walls 25 and 26 to form a flange 30. The flange 30 is provided with a plurality of bushing inserts 32 which receive fasteners (not shown) for attaching panel 12 to the panel support structure (not shown). Other portions of layers 28 are laminated to corresponding portions of rear panel wall 26 and provide increased strength and rigidity to the panel structure, including the plateau. Each of panel walls 25, 26 and layers 28 may consist of multiple plies of fiberglass or other fiber-reinforced composite material. The honeycomb center 18 is attached to panel walls 25, 26 and to the innermost of layers 28 by a layer of structural adhesive 24.

The honeycomb center 18 comprises an open-cell pattern 22 and may be made of any of the following materials: aluminum, Nomex®, metal, syntactic foam, a composite material, or other types of material. The walls of the open-cell pattern have holes 20 that allow flow communication between adjacent cells. The cells are partially or fully filled with a vibration-damping foam material and/or vibration-damping particles (indicated by speckling in FIGS. 4 and 5), as disclosed in U.S. Patent Application Pub. No. US 2009/0184200. The above-described honeycomb structure, partially or fully filled with foam and/or particles, is intended to make the panel more resistant to vibration.

The embodiment depicted in FIG. 5 improves upon the prior art panel by further damping panel vibration. This is accomplished by attaching a vibration-damping blanket 36 to the back surface of the panel 12. For the particular panel depicted in FIG. 5, the blanket 36 is attached to the generally flat surface of the plateau formed by the rear panel wall 26. Blanket 36 is attached to the rear panel wall 26 by means of a layer of adhesive 34.

Testing has shown that blankets comprising Nomex® aramid staple fibers arranged in a ½- and 1-inch-thick nonwoven structure are effective in damping vibrations in a typical wing-to-body fairing. The overall dBA reduction was determined by summing the noise spectra over the critical frequencies of 315, 400 and 500 Hz ⅓ octave bands. Nomex® is a family of aromatic polyamide (aramid) fibers. Any other blanket having equivalent vibration-damping properties can be used in the alternative. Preferably, the fibers of the vibration-damping blanket have the capability to repel water. Water-repellant Nomex® blankets bearing the product designation MC8-4591-B18 are commercially available. These blankets are sold with pre-applied adhesive on one side, the adhesive being covered by a peel-away release film. After the release film has been peeled off to expose the adhesive, the side of the blanket having adhesive thereon can be pressed against a fairing panel to adhere the blanket to the panel.

In accordance with one embodiment, a multi-panel fairing of an existing flight vehicle can be retrofitted with vibration-damping blankets. The exterior of the flight vehicle fairing comprises the exterior surfaces of a multiplicity of removable panels. All or some of the removable panels can be retrofitted with vibration-damping blankets on their back surfaces to reduce fairing vibration, fatigue and noise. The fairing may be a component of an aircraft, spacecraft or other flight vehicle. Testing has shown that the application of vibration-damping blankets to the back surfaces of at least selected panels located aft of the fair wheel wells is advantageous. The retrofitting method for each removable panel comprises the following steps: (1) removing the panel from the fairing; (2) attaching a vibration-damping blanket to a back surface of said removed panel by means of a layer of adhesive; and (3) installing the panel with attached vibration-damping blanket on the fairing with the exterior surface of the panel forming part of the fairing exterior. In one embodiment, the vibration-damping blanket comprises aromatic polyamide fibers in a nonwoven structure, which fibers have been treated with water-repellant agent.

In accordance with another embodiment, vibration-damping blankets can be attached to the back surfaces of a multiplicity of panels of a multi-panel fairing during original assembly of the flight vehicle. Again this can be accomplished by adhering water-repellant Nomex® blankets to the back surfaces of selected fairing panels.

Testing has shown that the application of Nomex® blankets (treated with water repellant) to panels of a typical wing-to-body fairing of an airplane is an acceptable solution in terms of weight, damping benefits, cabin noise reduction, ease of retrofit for a large in-service fleet, ease to put into production in terms of build time and cost while also ensuring that the aircraft loft lines do not alter, and ability to withstand an arduous environment/life-cycle considerations.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed herein.

The invention claimed is:

1. A method for retrofitting a flight vehicle fairing that has a removable panel, which removable panel has a front wall that forms part of an exterior surface of the flight vehicle, a rear wall that is not part of the exterior surface of the flight vehicle, and a honeycomb structure at least partially filled with foam and/or particles and disposed between the front and rear walls of the panel, said method comprising:
   removing said panel from said fairing;
   adhering fibers on one side of a vibration-damping nonwoven fabric to an exterior surface of the rear wall of said removed panel while leaving fibers on another side of said vibration-damping nonwoven fabric uncovered; and
   installing said panel with said adhered vibration-damping nonwoven fabric on said fairing with an exterior surface of the front wall of said panel being part of the exterior surface of the flight vehicle and said vibration-damping nonwoven fabric being exposed inside said fairing and not part of the exterior surface of the flight vehicle.

2. The method as recited in claim 1, wherein the fibers are made of polymeric material.

3. The method as recited in claim 2, wherein said polymeric material comprises aromatic polyamide.

4. The method as recited in claim 1, further comprising treating the fibers of said vibration-damping nonwoven fabric with water repellant additive.

5. The method as recited in claim 1, wherein said fairing comprises a pair of wheel wells, said panel being located aft of the wheel wells.

6. The method as recited in claim 1, wherein said fairing is a component of an aircraft.

7. The method as recited in claim 1, wherein said fairing is a component of a spacecraft.

8. A method for assembling a flight vehicle fairing, comprising:

obtaining a panel that comprises front and rear walls and a honeycomb structure at least partially filled with foam and/or particles and disposed between the front and rear walls of said panel;

adhering fibers on one side of a vibration-damping nonwoven fabric to an exterior surface of the rear wall of said panel while leaving fibers on another side of said vibration-damping nonwoven fabric uncovered; and installing said panel with said adhered vibration-damping nonwoven fabric on said fairing with an exterior surface of the front wall of said panel being part of the exterior surface of the flight vehicle and said vibration-damping nonwoven fabric being exposed inside said fairing and not part of the exterior surface of the flight vehicle.

9. The method as recited in claim 8, wherein the fibers are made of polymeric material.

10. The method as recited in claim 9, wherein said polymeric material comprises aromatic polyamide.

11. The method as recited in claim 8, wherein said fairing is a component of an aircraft or a spacecraft.

12. The method as recited in claim 8, wherein said fairing comprises a pair of wheel wells, said panel being located aft of the wheel wells.

13. A fairing for a flight vehicle comprising a multiplicity of panels, at least one of said panels comprising front and rear walls and a honeycomb structure at least partially filled with foam and/or particles and disposed between the front and rear walls of said panel, further comprising a vibration-damping nonwoven fabric that comprises fibers on one side which are adhered to an exterior surface of the rear wall of the panel and fibers on another side which are uncovered, wherein an exterior surface of the front wall of the panel forms part of the exterior surface of the flight vehicle and said vibration-damping nonwoven fabric is exposed inside said fairing and not part of the exterior surface of the flight vehicle.

14. The fairing as recited in claim 13, wherein said fibers are made of polymeric material.

15. The fairing as recited in claim 14, wherein said polymeric material comprises aromatic polyamide.

16. The fairing as recited in claim 13, wherein said vibration-damping nonwoven fabric is water repellant.

17. The fairing as recited in claim 13, further comprising a pair of wheel wells, said panel being located aft of the wheel wells.

18. The fairing as recited in claim 13, wherein said flight vehicle is an aircraft or a spacecraft.

* * * * *